United States Patent

[11] 3,576,953

[72] Inventor Werner Hauer
Sayre, Pa.

[21] Appl. No. 742,226
[22] Filed July 3, 1968
[45] Patented May 4, 1971
[73] Assignee Neo Dynamics, Inc.
Irvington, N.J.

[54] MAGNETIC TAPE INFORMATION STORAGE DEVICE
7 Claims, 10 Drawing Figs.

[52] U.S. Cl. ........ 179/100.2, 340/174.1
[51] Int. Cl. ........ G11b 5/76, G11b 25/02
[50] Field of Search ........ 179/100.2, 100.2 (X), 100.2 (Rev), 100.2 (A), 100.2 (Z); 274/17, 4.2, 44; 346/138; 101/415.1

[56] References Cited

UNITED STATES PATENTS

| | | | |
|---|---|---|---|
| 3,015,690 | 1/1962 | Mason et al. | 346/138 |
| 3,057,969 | 10/1962 | Stolle | 179/100.2 |
| 2,812,948 | 11/1957 | Roberts | 174/17 |

*Primary Examiner*—J. Russell Goudeau
*Attorney*—Stanley Wolder

ABSTRACT: An information storage device includes a rotatable drum having an anchoring element spaced from the periphery thereof. A magnetic recording tape extends around the periphery of the drum and has a tail engaging the anchoring element to provide a free path between the tape and the drum periphery for the reception of a spring biased member which urges the tape into sliding engagement with the opposing face of a magnetic transducer. In one form the drum is provided with a separable end plate provided with a pair of closely peripherally spaced longitudinal legs, and the tape is in the form of an endless ring looped about the leading and trailing edges of respective legs.

INVENTOR
WERNER HAUER
BY Stanley Wolder
ATTORNEY

INVENTOR
WERNER HAUER
BY Stanley Wolder
ATTORNEY

MAGNETIC TAPE INFORMATION STORAGE DEVICE

BACKGROUND OF THE INVENTION

The present invention relates generally to improvements in information storage devices and it relates more particularly to an improved magnetic tape recording and read out system.

The conventional magnetic information storage devices are generally of two types, the magnetic drum or disc which are commonly used for rapid access digital recording and readout and the magnetic tape which is widely used for audio recording as well as slow access digital recording. The use of the magnetic drum has the advantage of a simple drive at a uniform desired speed but possesses an important drawback and disadvantage in its association with a magnetic pickup or recording head. The resolution of the magnetic head both in pickup and recording is a function of its spacing from the information bearing magnetic surface, such spacing should be as small and uniform as possible. To obtain a small spacing between the magnetic head and the surface of the magnetic drum is extremely difficult and costly and is justified only in the most expensive equipment. With magnetic tape, on the other hand, the tape is drawn across the face of the magnetic head and there is little or no problem in achieving a uniform engagement between the tape and the magnetic head for maximum resolution. However, the use of magnetic tape as accompanied by another drawback in that it is difficult to advance the tape at a uniform rate without slippage which is a requirement for high fidelity reproduction. Capstan drives and guide pins are employed for this purpose but they are complicated and frequently unreliable arrangements which do not achieve the desired end and otherwise leave much to be desired. Moreover, in the magnet tape systems heretofore employed and proposed, suitable closed loop systems of short lengths have not been available.

SUMMARY OF THE INVENTION

A principal object of the present invention is to provide an improved information recording system.

Another object of the present invention is to provide an improved magnetic information storage device.

Still another object of the present invention is to provide an improved magnetic tape information storage device.

A further object of the present invention is to provide an improved magnetic tape information storage device in which a short information sequence is continuously repeatedly available and in which the tape is transported across the face of a magnetic transducer head.

Still a further object of the present invention is to provide a device of the above nature characterized by its simplicity, reliability, high fidelity and resolution, adaptability, versatility and low cost.

The above and other objects of the present invention will become apparent from a reading of the following description taken in conjunction with the accompanying drawings which illustrate preferred embodiments of the present invention.

In a sense the present invention contemplates the provision of an information rotatable storage device comprising a rotatable drum, an anchoring member mounted on said drum and an information storage tape extending about the full periphery of said drum and engaging said anchoring member. The anchoring member is advantageously positioned outwardly of the periphery of the drum so that access is provided for the full periphery of the drum and an outwardly sprung relatively stationary pressure member is positioned between the drum periphery and the tape to urge the latter into sliding engagement with the opposing face of a magnetic pickup. The anchoring member advantageously includes a pair of circumferentially spaced longitudinally extending leading and trailing anchor elements said tape being an endless closed ring looped about the leading edge of the leading anchor element and the trailing edge of the trailing anchor element. In accordance with another form of anchoring arrangement the anchoring member is a longitudinal finger positioned outwardly of the periphery of the drum and the leading end of the tape is provided with a closed loop engaging the finger, the tape extending about the drum to a position underlying the leading end of the tape.

The storage device of the present invention avoids the principal drawbacks of the conventional magnetic storage device in that a uniform tape advance without slippage is simply achieved with a wiping engagement between the transducer and tape.

DESCRIPTION OF THE PREFERRED EMBODIMENTS

Figure 1:
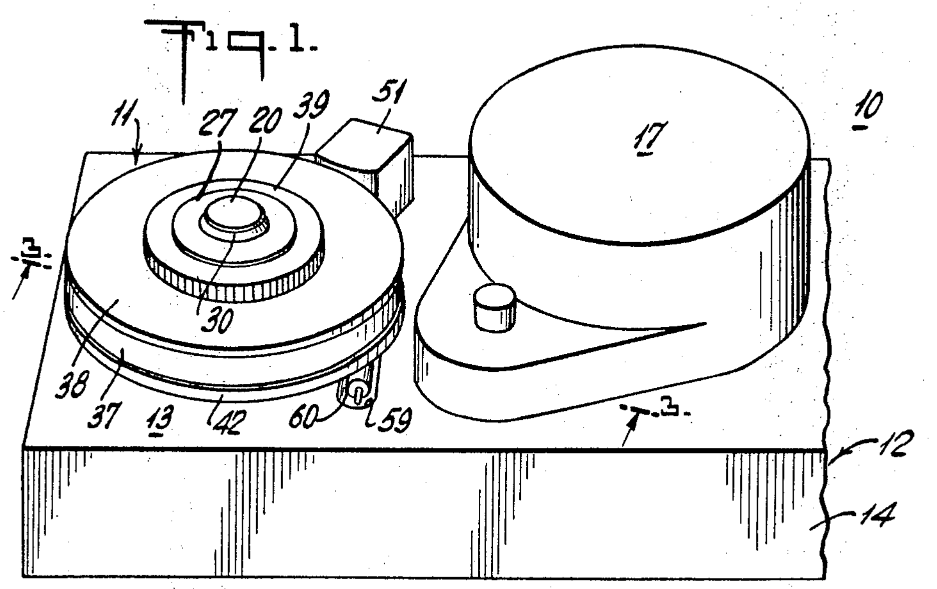
FIG. 1 is a fragmentary front perspective view of a recording device embodying the present invention.
Figures 2, 3, 4:
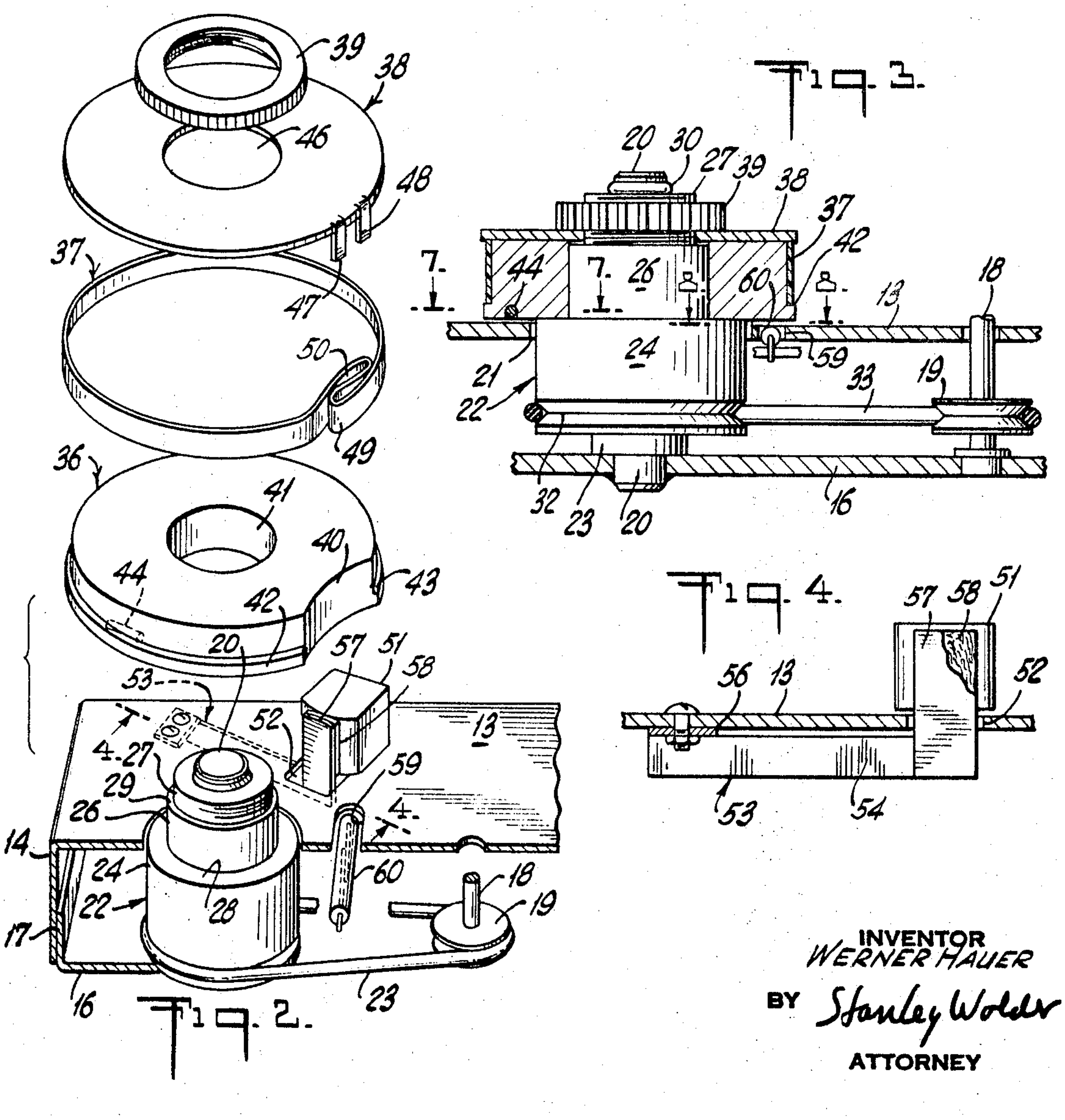
FIG. 2 is a fragmentary exploded perspective view thereof.
FIG. 3 is a sectional view taken along line 3–3 in FIG. 1.
FIG. 4 is a sectional view taken along line 4–4 in FIG. 2.

Referring now to the drawings and particularly FIGS. 1 to 8 thereof which illustrate a preferred embodiment of the present invention, the reference numeral 10 generally designates a recording and playback deck provided with the improved magnetic information storaging device 11. The deck 10 comprises a base and housing member 12 including a horizontal rectangular top wall 13 having front, rear and sidewalls 14 depending from the edges thereof, and a rectangular bottom or base wall 16 provided along its edges with upstanding flanges 17 tightly engaging the inside faces of the walls 14.

Mounted atop the wall 13 and spaced from the end thereof is a constant speed electric motor 17 of known-type provided with means for connecting it to a source of current. The motor 17 includes a depending vertical drive shaft 18 which projects through an opening in the wall 14 and engages a bearing positioned on the bottom wall 16. A pulley 19 is affixed to the drive shaft 18 between the walls 13 and 16.

A vertical axle 20 laterally spaced from the shaft 18 is mounted on the bottom wall 16 and projects upwardly above the top wall 13 and is coaxial with a large circular aperture 21 formed in the top wall 13. A spindle 22 is rotatably supported by the axle 20 and positioned above the wall 16 by a washer 23 on the axle 20 between the wall 16 and the flat underface of the spindle 22. The spindle 22 includes an enlarged cylindrical lower section 24, an intermediate cylindrical section 26 and an externally threaded upper section 27. The spindle lower section 24 is delineated from the spindle intermediate section 26 by a horizontal peripheral shoulder 28 which is slightly above the level of the top face of the top wall 13. The spindle sections 26 and 27 are separated by an upwardly facing peripheral shoulder 29, the top section 27 terminating below the top of the axle 20. A locking member 30 engages the axle 20 above the spindle 22 to retain the spindle 22 thereon. A peripheral groove 32 is formed in the spindle section 24 at the level of the pulley 19 and is connected thereto by a belt 33 to effect the constant speed rotation of the spindle 22.

The magnetic information storage device 11 includes a separable assembly of a shallow drum member 36, an endless magnetic band or tape 37, an end plate 38, and a lock nut 39. The drum member 36 is of substantially cylindrical configuration having an arcuate recess 40 formed in the recess thereof and extending for the full height of the drum 36 and having a circular central opening 41 of about the diameter of that of the spindle intermediate section 26 to permit the separable coaxial mounting of the drum 36 on the spindle 22. The height of the drum 36 is slightly greater than that of the intermediate spindle section 26 and in an assembled condition the drum 36 rests on the spindle shoulder 28 and is coaxial with and projects above the upper spindle shoulder 29. Except for the recessed section 40, the lower border of the drum 36 is provided with a peripheral lip 42 having an upper peripheral shoulder 43. A recess is formed in the underface of the drum 36 adjacent its periphery and a permanent magnet element 44 is nested therein.

The end plate 38 is of annular shape having an outer diameter about equal to that of the lip 42 and a circular central opening 46 of a diameter approximately that of the spindle threaded section 27. A pair of closely spaced circumferentially spaced anchoring elements or fingers 47 and 48 depend vertically from the periphery of the plate 38 and are circumferentially separated and are of a height slightly less than that of the drum 36. In the assembled condition, the plate 38 rests coaxially on the top face of the drum 36 with the opening 46 engaged by the spindle threaded section 27 and the anchoring fingers 47 and 48 medially registering with the opening to the recess 40.

The endless magnetic tape 37 is of any well known composition and encircles the drum 36 registering with the peripheral groove delineated by the peripheral face of the drum 36, the shoulder 43 and the peripheral border of the plate 38. A section of the endless tape 37 is of substantially reverse S-shape as viewed from above to delineate a forward loop 49 closed at its front end and extending about the leading edge of the finger 47 and a rear loop 50 closed at its rear end and open at its front end and extending about the trailing edge of the finger 48. It should be noted that the spindle 22 and drum 36 are driven by the motor 17 in a clockwise direction as viewed from above.

Figure 5:
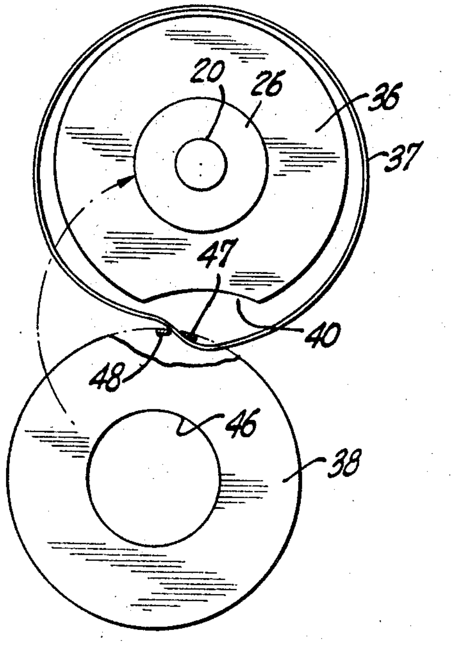
FIG. 5 is a partially diagrammatic top plan view of the drum and tape assembly in a disassembled condition.
Figure 6:
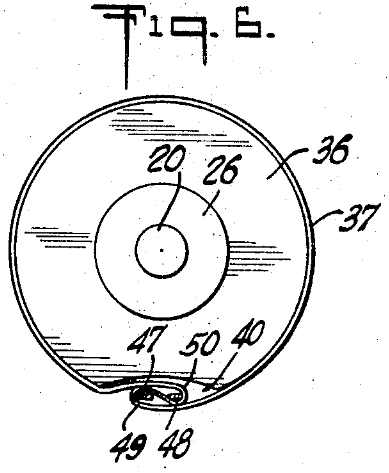
FIG. 6 is a partially diagrammatic top plan view thereof in assembled condition.
Figure 7:
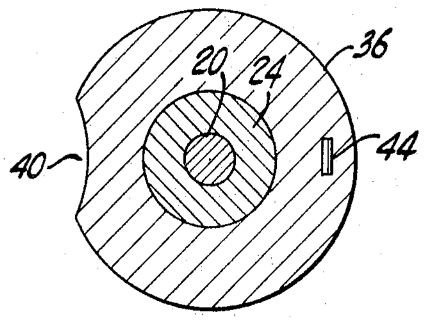
FIG. 7 is a sectional view taken along line 7–7 in FIG. 3.

The tape 37 may be readily and easily replaced or applied to the drum, for example in the manner illustrated in FIG. 5 of the drawing. The tape 37 is placed on the drum and pulled outwardly at the recess 40. The end plate 38 is positioned outwardly of and adjacent to the recess 40 with the fingers 47 and 48 in alignment therewith and the tape passing through the space between the fingers 47 and 48 about the inner face of the finger 47 and about the outer face of the finger 48. The plate 38 is then swung clockwise about a vertical axis adjacent to the fingers 47 and 48 to form the loops 49 and 50 about the fingers 47 and 48 respectively as aforesaid, and is brought to a position coaxially with the spindle 22 and lowered into engagement with the spindle section 27 onto the drum 36. The assembly is then locked in position by applying and tightening the nut 39 to the threaded section 27.

A multitrack magnetic recording and/or pickup head 51 of known construction is mounted atop the top wall 13 and has a convex cylindrical front face closely spaced from and confronting the peripheral surface of the drum 36 and the outer face of the tape 37. An opening 52 is formed on the wall 13 adjacent the outer face of the tape 37. A pressure member 53 is mounted to the underface of the wall 13 and includes an elongated resilient arm 54 formed of a spring metal band or the like and extending longitudinally from the head 51 in a direction tangent to the drum 36. The end of the arm 54 remote from the magnetic head 51 has a horizontal bracket lug 56 formed on its upper edge and fastened to the underface of the top wall 13. An upwardly directed leg 57 is formed at the free end of the resilient arm 54 and defines a pressure foot or element. The leg 57 projects through the opening 52 and has an outer face directed toward the head 51. A low friction pad member 58 of known characteristics is affixed to the outer face of the leg 57.

Under normal operating conditions the pressure element 57 is positioned between the tape 37 and the periphery of the drum 36 and is resiliently urged outwardly toward the front face of the magnetic head 51 to outwardly bulge the tape conveyed by the drum as the tape travels about the pressure element 57 to press the front face of the tape into sliding engagement with the front face of the magnetic head 51 in a precisely and accurately positioned manner.

An opening 59 is formed in the top wall 13 underlying the circular path of the magnet 44 and forwardly circumferentially preferably offset from the magnetic head 51 a distance corresponding to that between the magnet 44 and the recess 40. A suitably encased magnetically actuated reed switch 60 is positioned in the opening 59 and is actuated when the magnet element 44 is in registry therewith. The magnetic head 51 is connected in the known manner to a recording and playback network. The switch 60 may be employed for any desired function, for example it may actuate a sequential switch for sequentially connecting the pickup elements of the magnetic head 51 to the playback network whereby to play the tape tracks successively or it may block the playback network as the anchor fingers 47 and 48 pass the magnetic head 51.

In the operation of the apparatus described above, the tape is positively driven at a constant speed without slippage since it is always positively pulled by the constant speed fingers 48 and 49. Moreover, the pressure member 57 urges the tape 37 into positive contact with the magnetic head 51 so that maximum resolution is achieved.

Figure 9:
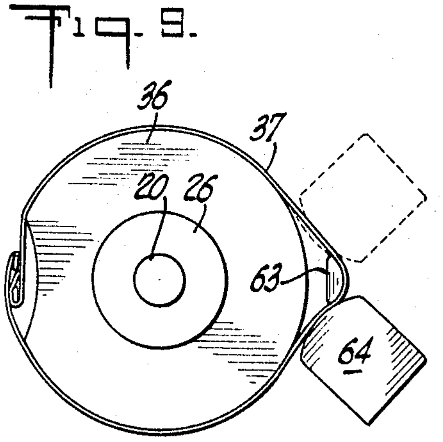
FIG. 9 is a top plan view of the storage drum and tape and associated magnetic heads in accordance with another form of the present invention.
Figure 8:
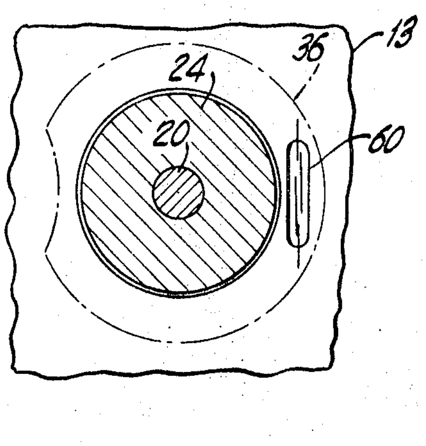
FIG. 8 is a sectional view taken along line 8–8 in FIG. 3.

An alternative arrangement for urging the tape 37 into sliding engagement with the magnetic head is illustrated in FIG. 9 of the drawings and differs from that above described only in the relative position of the pressure member and magnetic head and the shape of the pressure member. Specifically, in place of the pressure member 57 there is provided a guide element 63 having a cylindrical outer face and positioned between the drum 36 and the tape 37. Like the pressure member 57 the guide element is mounted at the free end of a resilient arm and presses outwardly against the inner face of the tape 37 to outwardly bulge the traveling tape from the drum 36. A magnetic head 64 is positioned adjacent to the guide element 63 and is circumferentially offset relative thereto having a convex cylindrical front face engaging the outer face of the tape 37 along the bulged section thereof between the guide element 64 and the drum 36 whereby a predetermined length of the tape 37 is slidably engaged by the magnetic head 64. A second magnetic head, illustrated by broken line, may be positioned on the opposite side of the guide element 63 and slidably engage a corresponding bulged opposite section of the tape 37. The arrangement illustrated in FIG. 9 operates in the manner of the arranged earlier described.

Figure 10:
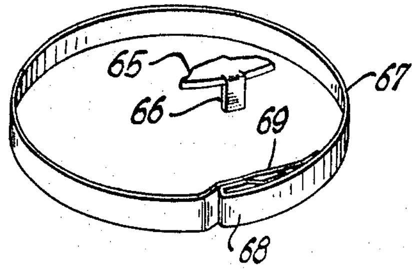
FIG. 10 is a fragmented perspective view of another form of tape anchoring arrangement.

In FIG. 10 of the drawing there is illustrated another manner of anchoring the magnetic tape to the drum. Specifically the drum is provided with an end plate 65 corresponding to the end plate 38 but provided with only one depending finger 66 of the structure and relationship of the finger 47. A magnetic tape 67 is provided at its leading end with a closed loop 68 which slips onto and engages the finger 66. The tape 67 extends counterclockwise about the drum and its tail end 69 underlies the leading section of the tape 67 and may be suitably secured thereto. The magnetic storage device last described operates in the manner of those earlier described, it being noted that the tape carrying drum is rotated clockwise. As in the earlier embodiments there is a free path between the drum and the tape for the full periphery of the drum.

While there have been described and illustrated preferred embodiments of the present invention, it is apparent that numerous alterations, omissions and additions may be made without departing from the spirit thereof.

I claim:

1. An information storage device comprising a rotatable drum, anchoring means mounted on said drum and including an anchoring element extending longitudinally of and spaced from the periphery of said drum, an information storage tape extending about the full periphery of said drum and engaging said anchoring element to provide unimpeded peripheral accessibility continuously for the full periphery of said drum between said drum and said tape and a relatively stationary pressure member positioned between said tape and said drum and resiliently outwardly urged against the inner face of said tape.

2. The information storage device of claim 1 including a pickup head adjacent to and spaced outwardly from the periphery of said drum, said relatively stationary pressure member positioned between said tape and said drum in the vicinity of said pickup head and resiliently outwardly urged to urge said tape into engagement with said pickup head.

3. The information storage device of claim 1, said tape being provided at its leading end with a loop engaging said anchoring element.

4. The information storage device of claim 3, wherein said tape has a tail section which is positioned between the leading section of said tape and the periphery of said drum.

5. The information storage device of claim 1 wherein said anchoring means comprises a pair of circumferentially spaced longitudinally extending leading and trailing anchor elements said tape being an endless closed ring looped about the leading edge of the leading anchor element and the trailing edge of the trailing anchor element.

6. The information storage device of claim 5 including a bracket member separably supporting said anchor elements radially outwardly of the periphery of said drum.

7. The information storage device of claim 1 wherein said anchor element and the periphery of said drum lie in the peripheral surface of a circular cylinder, said drum being rotatable about the axis of said cylinder.